June 11, 1940.  W. J. FORREST  2,204,349
FILTERING OR STRAINING OR LIKE TREATMENT OF FLUIDS
Filed Aug. 26, 1937  8 Sheets-Sheet 2

June 11, 1940.      W. J. FORREST      2,204,349
FILTERING OR STRAINING OR LIKE TREATMENT OF FLUIDS
Filed Aug. 26, 1937      8 Sheets-Sheet 4
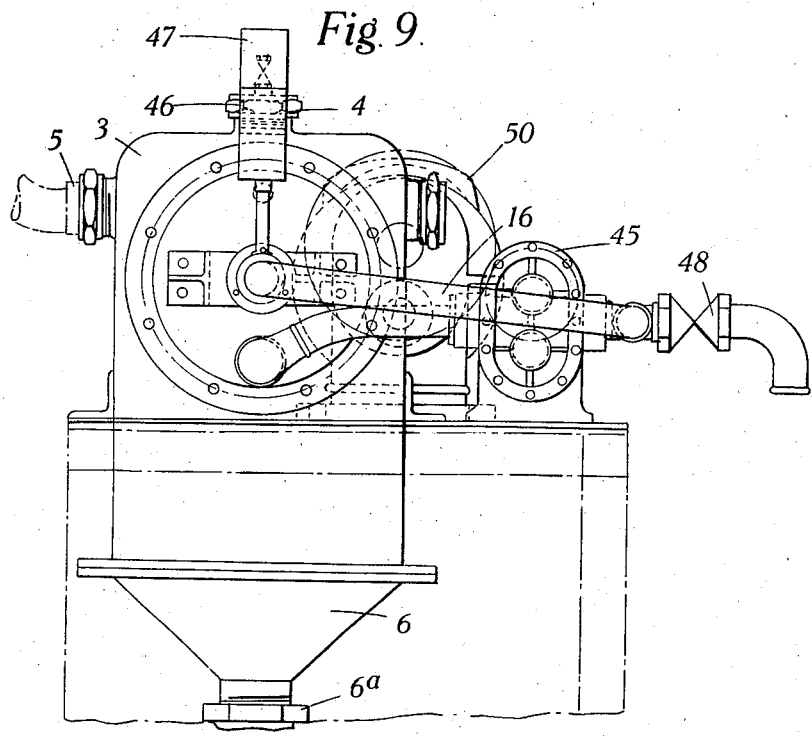
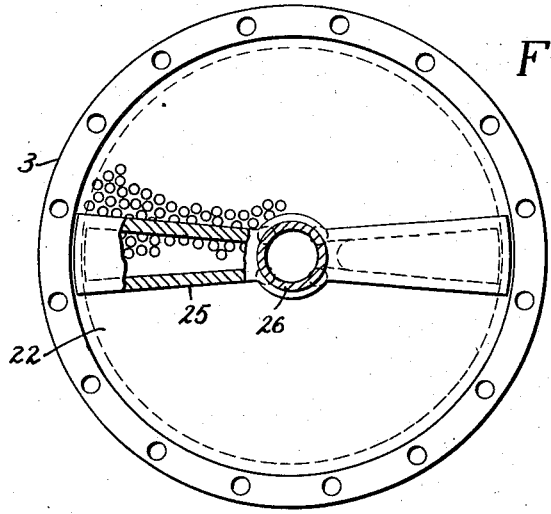
INVENTOR
William James Forrest
BY
Albert F. Nathan
ATTORNEY

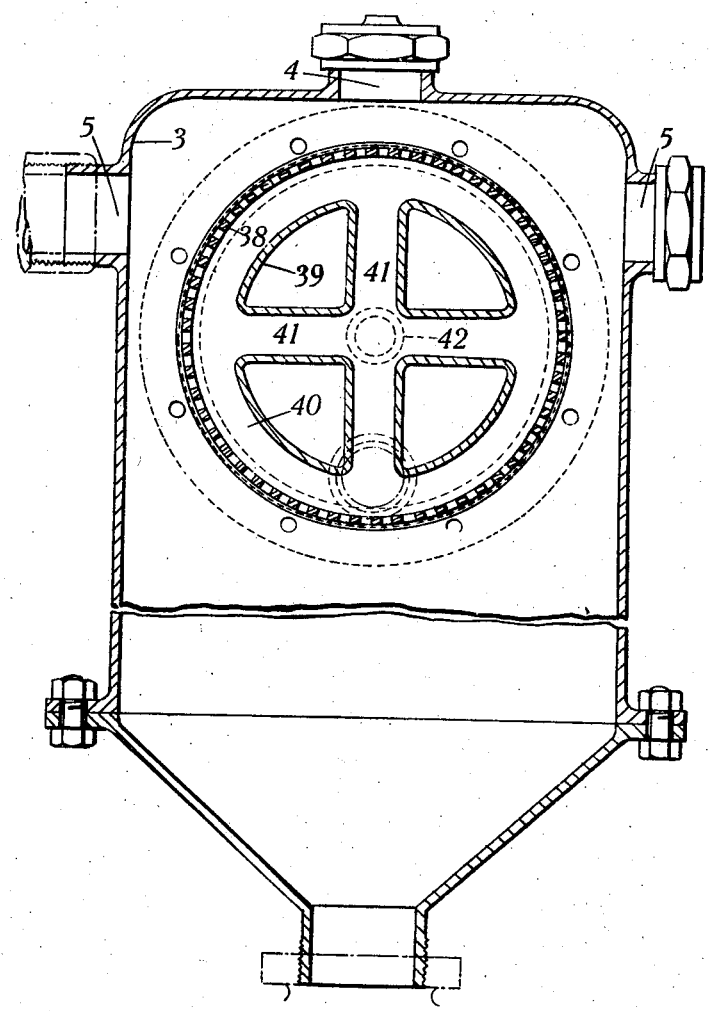

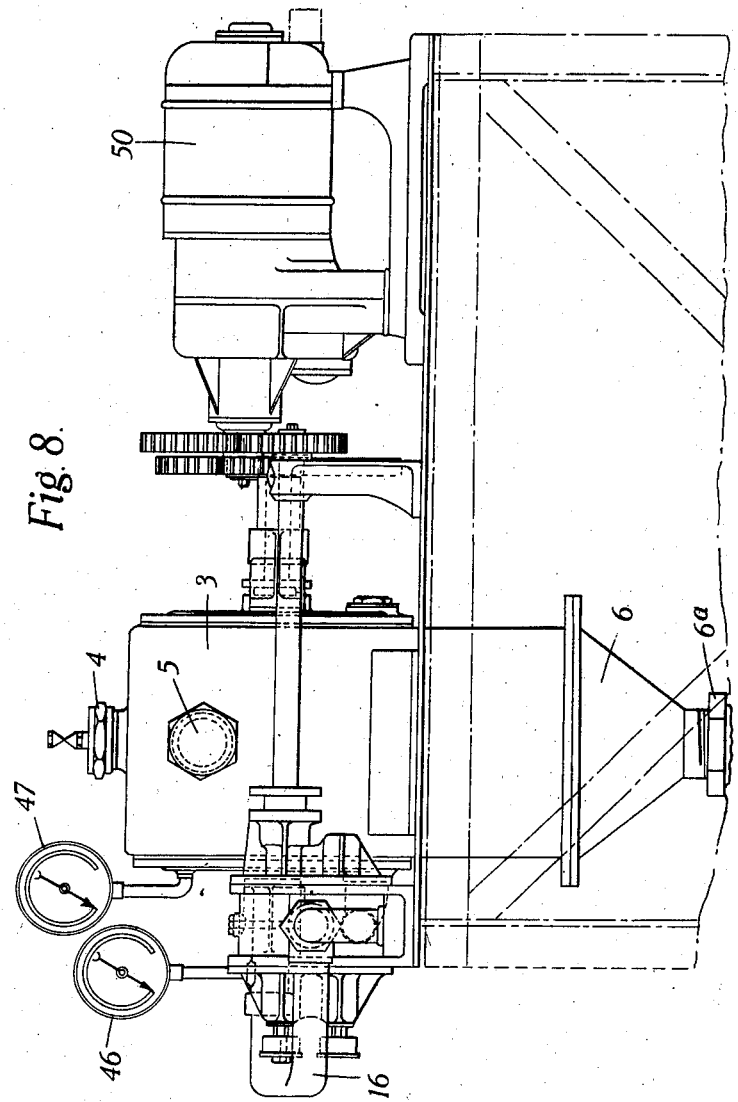

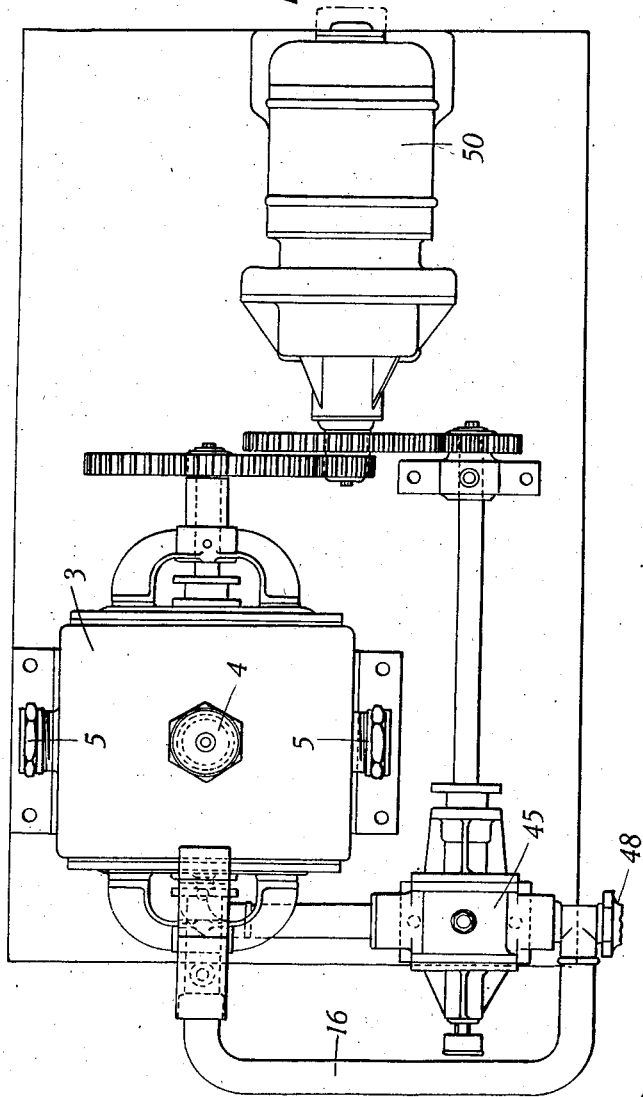

Patented June 11, 1940

2,204,349

UNITED STATES PATENT OFFICE 2,204,349

FILTERING OR STRAINING OR LIKE TREATMENT OF FLUIDS

William James Forrest, Ilford, England

Application August 26, 1937, Serial No. 160,982
In Great Britain May 11, 1937

5 Claims. (Cl. 210—152)

The present invention relates to the filtering and like treatment of liquids with the object of obtaining a pure filtrate. Although the invention is applicable for filtering various liquid materials, it is particularly applicable for obtaining pure filtrates consisting of viscous liquids containing pigments, powders, crystals or other solid matter in suspension in a finely divided state. The passing of some liquids, such as varnishes and oils, through separating surfaces is sometimes termed "refining" and it is to be understood that the term "filtering" used herein is intended to cover such treatments and all forms of straining where the object is to obtain and collect a pure liquid filtrate. In the following description the filtering or straining means, which may be gauze (e. g., of metal) silk, cloth, paper, washleather or other material or may be slots or the like produced by finely spaced plates or by other suitable means are termed filtering medium.

The object of the present invention is to provide an improved method of effecting the filtration, cleaning the filtering medium and separating the dross, i. e., the particles held back by the filtering medium, whilst avoiding waste of or the introduction of foreign matters into the liquid being treated and effecting these objects so that the apparatus and filtering medium is protected so far as possible from injury and the filtration can proceed continuously whilst each portion of the filtering medium is periodically cleaned in a uniform manner.

To effect this object I pass the liquid through the filtering medium and traverse over the clean side of such medium, i. e., the side on which the filtrate is collected, one or more cleansing heads to which a portion of the liquid is led back under pressure, so avoiding the introduction of air or other foreign matter which might pollute or effect undesirable changes in the liquid, and allowing the dross to separate itself from the liquid under the influence of gravity, whilst any moving part which might prejudicially be affected by the access of the dross is protected therefrom by the filtering medium.

It is preferred to arrange for the cleaning action to take place continuously, but in some cases it may be sufficient if this is only effected periodically e. g., if the access of the liquid to the cleansing head is interrupted at intervals. It is however essential that the filtering should proceed continuously, and further that the cleansing operation whether continuous or intermittent should be effected uniformly so that each part of the filtering medium is cleaned evenly. I would therefore have it understood that I do not include in my claims apparatus in which the cleansing heads consist of moving vanes or other devices which do not clean uniformly each part of the filtering medium.

The liquid can be made to pass through the apparatus by any convenient means i. e., under the influence of gravity or by the application of pressure or vacuum.

Another object of the invention is to provide an improved apparatus for carrying out the method.

Amongst other advantages achieved by the invention are, (1) the avoidance of a rotating drum or other filter carrier, since such devices involve the difficult task of maintaining good running joints between the rotating filter drum and its end plates or casing, a bad joint or wear between such parts causing undesirable dross or the like to pass into the filtrate; (2) the cleansing head works in the vacuum chamber of the filter, viz., the side containing the filtrate and consequently is free to move without hindrance by the presence of dross which is forced by the pressure in the sector off the filtering media on the crude material side of the said media; the entry of crude material into the cleaning head is therefore precluded even though a good seal between the head and the filtering media or its support is not present and furthermore as there is no rejected material within the vacuum chamber, it cannot be pressed against the filtering surface by the moving head; (3) there is no part which rubs the dross against the filtering media; (4) the arrangement of the movable head in the vacuum chamber facilitates the object of allowing the rejected material to settle by gravity, assisted by the pressure of the cleansing medium, away from the filtering zone; and (5) a steady and continuous supply of pressure medium for cleaning the filter can be maintained as the filtering operation proceeds.

In order that the present invention may be the more readily understood, reference is made to the accompanying drawings which show three forms of filtering apparatus by way of example constructed according to the present invention.

Fig. 8 is a side view, Fig. 9 an end view and Fig. 10 a plan view of filter and its associated pump and driving motor.

Figure 1:
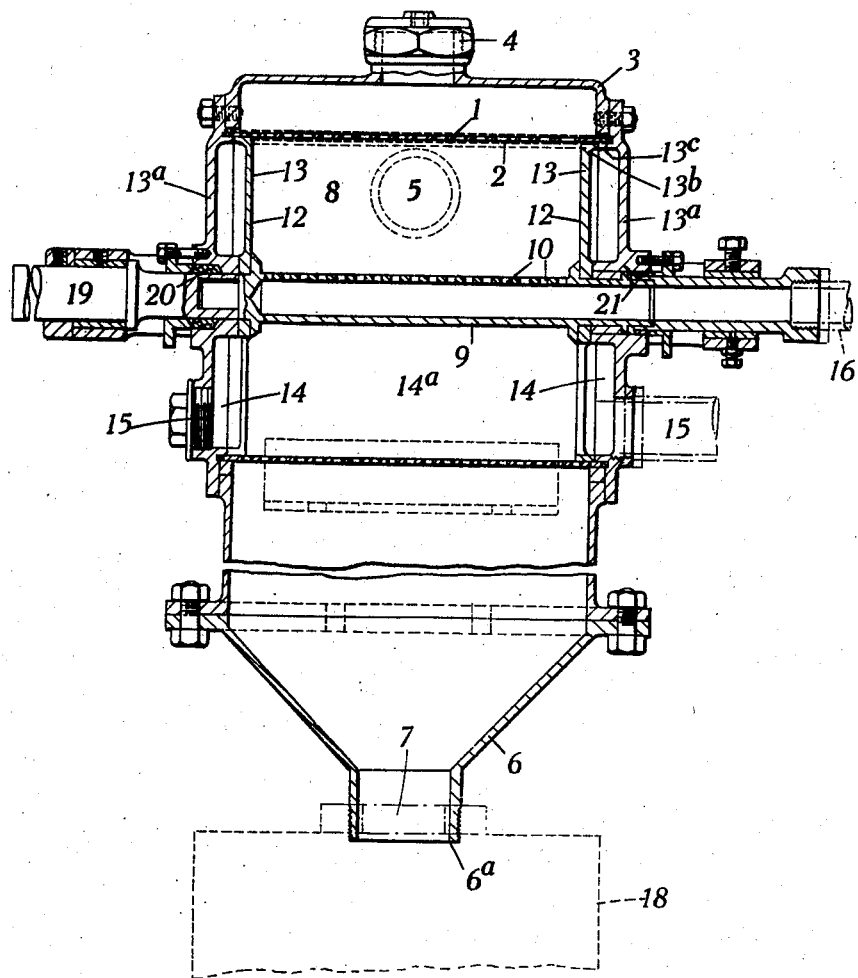
Fig. 1 is a side sectional elevation and Fig. 2 an end sectional elevation of one form employing a drum type filter and a rotary cleansing head.
Figure 2:
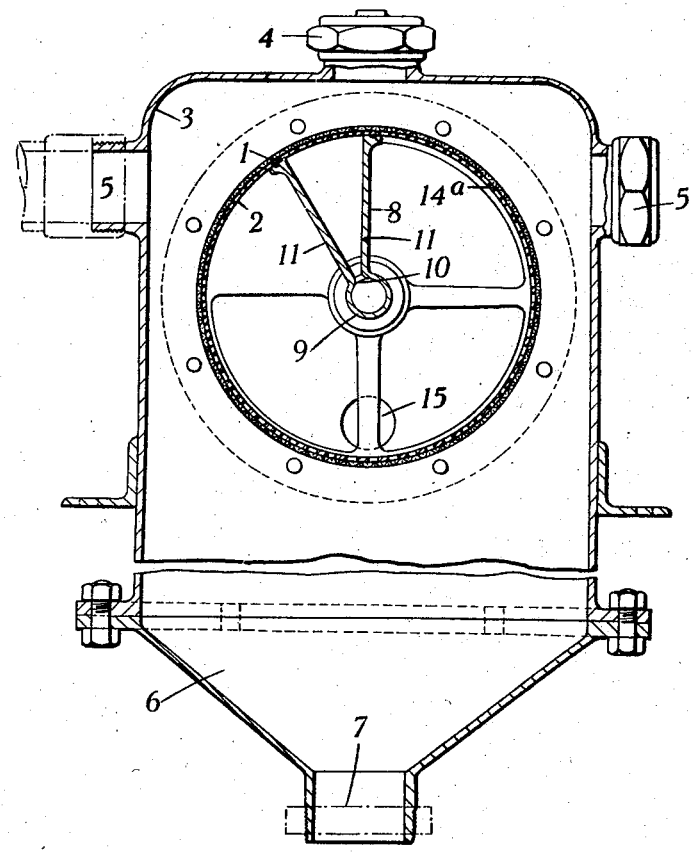

In each of the forms described, the same principle is employed, viz., vacuum and pressure act simultaneously at different zones of the filtering media, preferably without any interruption except for the removal of the rejected material.

According to the first constructional form illustrated, the filtering medium 1, e. g., gauze, (e. g., of stainless steel or other metal) silk, cloth, paper, washleather, or any suitable filtering medium is wrapped round a perforated drum 2. The drum is suitably fixed in an outer casing or receiver 3 into which the crude or unrefined material is fed, e. g., through a top or side opening or openings 4, 5, by gravity, pump or any suitable means. It is preferred to cause the material to flow in quietly by gravity so as to disturb the sludge as little as possible.

This filtering apparatus is particularly applicable for filtering paint, varnish or other material in which the coarse material rejected is heavier than the finer material. Consequently the filtering drum is arranged in the upper portion of the receiver 3 and the latter is of sufficient depth to enable a gravity separation of the rejected material, so that the latter collects in the bottom of the receiver and is kept clear of the filtering zone and the region in which the cleaning material is forced back to mix with the crude material. If the sludge were lighter than the liquid the filtering drum would be in the lower portion of the receiving. It is preferred to cause the material to flow by gravity with as little head as possible, thereby limiting the pressure necessary in the cleansing head and avoiding too great a return of filtrate through the filtering medium. Moreover in this way the settling by gravitation of the dross forced off the filtering media is facilitated. It is advantageous to run the crude material from a large holder to the filter through a small float-valve controlled tank, so that the head is suitably reduced.

The receiver conveniently has a tapering sump 6 into which the coarse material or sludge collects and from which it may be discharged from outlet 6a, conveniently under the control of a valve 7. Within the drum is arranged a rotating hollow sector 8, the outer faces of which are preferably ground to make a good sliding fit with the internal wall of the drum and/or may be channelled to receive sealing material. The cleansing head may be in light contact with the filtrate side of the filtering medium or the carrier therefor but in general no absolute contact is necessary. This has the advantage that a space can be left equivalent to the diameter of any fine particles which form part of the filtrate, e. g., particles of $\frac{1}{1000}$ inch diameter and thereby wear is avoided and the life of the filtering medium prolonged.

Any substantially greater space should however be avoided as it renders it more difficult to efficiently clean the medium and to clear the dross away from such medium to a sufficient distance to facilitate its separation from the liquid and its passage to a portion of the apparatus from which it can be conveniently evacuated.

The sector is mounted on a hollow shaft 9, the interior of which is in communication with the interior of the sector, by way of a multiplicity of holes or slots 10 in the shaft, the radial walls 11 of the sector being carried between end plates 12, or discs which seal off the ends of such walls and form a trough or sectorial compartment. The angle made by the radial walls may vary according to the material to be treated, but I have found that in dealing with paints or varnishes, an angle of 30° is suitable. A somewhat larger angle or a greater number of sectors may be necessary where a less viscous material is being treated so that the ratio of effective filtering area to area under cleaning is reduced, and correspondingly a smaller sector may be desirable for treating more viscous materials. This ratio and the speed of rotation of the sector must in any case be so chosen as to enable the cleansing head to act on any given strip of the filtering medium for a time sufficient to clean the medium effectively and to enable the cleansing head to reach the same strip again before the latter has clogged sufficiently to make it inoperative for filtering. The end plates or discs 12 and the end covers 13a of the casing or receiver are flanged or stepped back at 13b, 13c respectively to form a chamber 14 between each end plate or disc and the corresponding end cover, and the end plates are suitably constructed so that whilst either one of the annular chambers is in constant communication with the interior 14a of the drum and with the suction side of the external pump 45 by way of outlet 15 and pipe 49 (Figs. 8–10) and the outlet for the filtrate is not interrupted by the sector-closing portions of the end plate 12.

The pump 45 may be a rotary gear pump or other suitable pump for the purpose of creating a reduction in pressure in the end chamber 14 and in the chamber 14a within the drum so as to assist the fine material to pass through the filtering medium around the drum, whilst the hollow shaft 9 communicating with the interior of the rotating sector 8 is coupled by means of any suitable coupling or union piece to a pipe 16 leading to the pressure side of the pump. A small percentage of the filtrate is continually bye-passed through the pipe 16 from the pump through the hollow shaft and into the rotating sector 8, setting up a pressure in the sector sufficient to overcome the pressure in the receiver 3 containing the incoming crude material. The pressure applied will depend on the material being treated but in the treatment of certain paints a pressure in the sector of from 5 lbs. to 10 lbs. has been found suitable, depending upon the viscosity of the material.

It is desirable to include a gauge 46 in the line to the sector so that the pressure can be under observation and if desired automatic means may be provided for limiting the pressure when a predetermined reading is reached. The degree of vacuum may also be widely varied. For example, a gauge reading of ½" on gauge 47 is generally sufficient in the treatment of paints of somewhat low viscosity, whilst with a paint of rather high viscosity a reading of 10" or over may be reached. This gauge 47 may serve as an indicator, since any undue rise in the reading will indicate that the receiver is accumulating an undesirable quantity of sludge or rejected material. Any undue high vacuum can be overcome by returning the greater part of the filtrate to the pressure compartment and through the filtering medium or by closing the discharge valve 48 completely the whole of the filtrate could be returned for a few moments. The sludge or deposit meanwhile is removed from the filtering medium with immediate decrease in the vacuum. The discharge valve could be arranged to automatically close, or partially close, according to the degree of vacuum attained, and the sludge valve could also be automatically opened. Automatic means may be provided for stopping the pump or the inflow of crude material, such means if desired being responsive to the degree of vacuum reached in the filtrate chamber 14a.

The speed of rotation of the sector is also governed by the material under treatment; in general the lower the viscosity of the material being filtered the quicker must the pressure sector rotate. When treating paint of a viscosity of the order of treacle (and specific gravity 2.2), the running of the sector at about eight revolutions per minute has given good results. With a paint of a specific gravity of 1.5 it was found desirable to double the speed. The sector may be driven by an electric motor 50 (Figs. 8, 9 and 10) or by any suitable source of power.

The nature of the filtering medium also has an influence on the pressure with which the material is forced through the filter in one direction and the vacuum for causing the fine material to pass through in the first place. When using a finer gauze it is necessary to employ greater pressure and a higher degree of vacuum.

During the rotation of the sector the returned filtrate has the effect of blowing or pressing the dross or obstructing material off the filtering surface, forcing it to fall by gravity to the sludge sump.

Provision may be made to vary the speed of the sector and the speed of the pump. For example, expanding pulleys or other variable speed devices may be interposed in the drive of the sector and the pump.

A further container 18 may be located below the discharge from the sludge sump. The valve in the sump can be closed whilst the container is being emptied, but otherwise left open, so that the filter need not be stopped for sludge emptying.

It is convenient to provide inlets 5 for the crude material and outlets 15 for the filtrate on opposite sides of the apparatus, the inlet and outlet on one side being closed, if desired, whilst the others are in use. Or a top opening or openings may be provided for the incoming crude material; or this top opening may merely serve the function of an air vent. A pressure gauge may be mounted in communication with the receiver.

The hollow shaft carrying the sector vanes may be removably connected at one end to the driving shaft 19 and at the other end to the aforesaid union piece, appropriate stuffing boxes and glands 20, 21 being provided between the removable end plates of the casing and the driving shaft and union piece.

The apparatus can be constructed of metal, china, porcelain, wood or any other suitable material, according to the material with which the apparatus is intended to deal. In the apparatus described the axis of the drum and sector shaft is horizontally arranged, but it may be vertical or at a suitable inclination, suitable means being provided for the removal of the sludge.

If desired the radial vanes of the sector could be adjusted to vary the angle they make with each other, and thereby vary the ratio of effective filter area to cleaning area.

Figure 3:
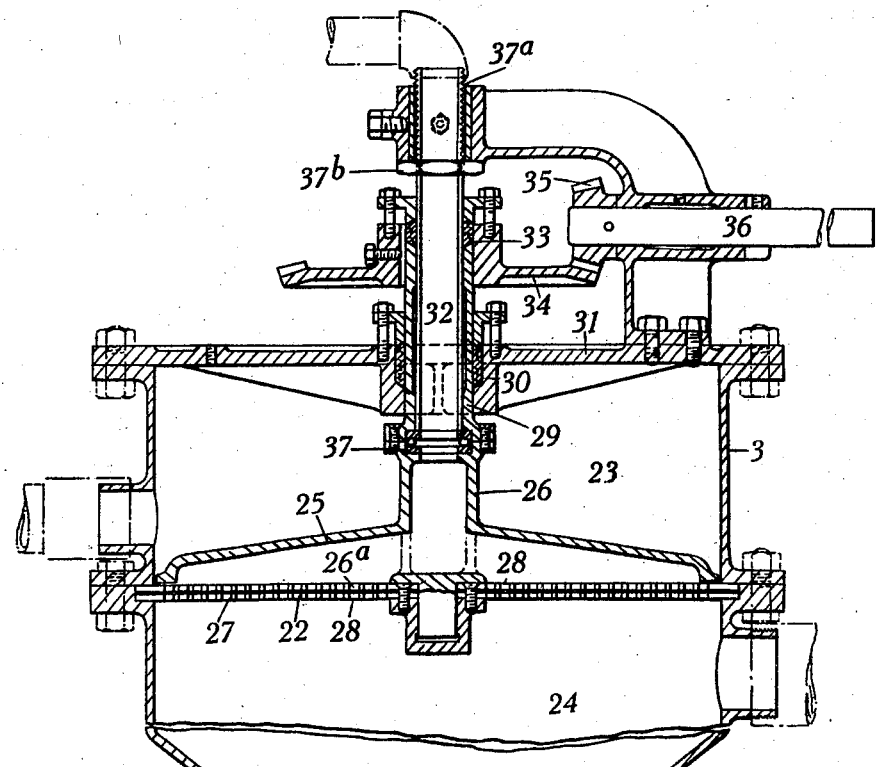
Fig. 3 is a side sectional elevation and Fig. 4 a sectional plan of another form employing a disc type filter and a rotary cleansing head.

The invention is not restricted to drum filters. According to the constructional form of the invention shown in Figs. 3 to 5, a disc or plate filter 22 is employed. This apparatus may comprise a suitable receiver 3 for the crude material and the filtering media 22 and discs 26a, 27 between which it is clamped divide the receiver into chambers 23, 24, e. g., upper and lower, the pressure compartment (cleansing head) being in the form of a hollow radial or diametral arm 25 at the end of a hollow shaft 26 which leads the pressure material to the arm, the latter rotating in the upper chamber 23 about the axis of the shaft over the disc of filtering media and thereby progressively subjecting zones of the filtering area to cleaning action. The crude material may be fed into the lower chamber 24 preferably at or near the top thereof through inlet 24a so as not to disturb the sludge and the finer material drawn through the filtering medium into the upper chamber, whereafter some part of the filtrate may be bye-passed back to the rotating arm, or other pressure medium forced into the arm, and returned through the filtering medium to mix with the crude material. The lower chamber is of sufficient depth to keep the sludge clear of the filtering medium.

The clamping discs 26a, 27 have multiple holes or slots 28 which conveniently are of tapering form enlarging in the direction of the filtering disc so as to present the maximum filtering area to the material to be treated. The holes in the drum of the drum type could be similarly shaped.

In certain cases, the filtering medium could be stretched over one perforated plate, the rotating arm 25 moving over the opposite surface of the plate.

Figure 5:
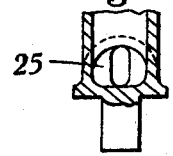
Fig. 5 is a section through the cleansing head, looking in the direction of the arrow A, Fig. 4.

The arm may be of uniform cross-section, e. g., having parallel walls or otherwise but in one advantageous form as shown the internal cross-section increases from the axis of rotation to the outer end of the arm, (see Fig. 5).

It is preferred to connect the receiver at 23a to an external pump, but the pump may be located in the receiver and suitably geared, if desired, to the rotating arm so that the drive of the latter is derived from the pump shaft.

In the form at present preferred, the arm is provided with an axial tubular extension 29 passing upwardly through gland 30 in a top cover 31 of the receiver 3 and rotating about a fixed inner tube 32 through which the pressure material is led to the arm, a suitable gland connection 33 being made between the rotating and the fixed tubes. The rotating tube carries a bevel wheel 34 driven by a bevel pinion 35 on a driving shaft 36 arranged over the top of the receiver. A ball or other suitable thrust bearing 37 may be interposed between the rotating arm and tube and the fixed tube. Adjustment of the pressure arm 25 on the clamping disc 26a is made by actuating screw 37a and lock nut 37b.

Figure 6:
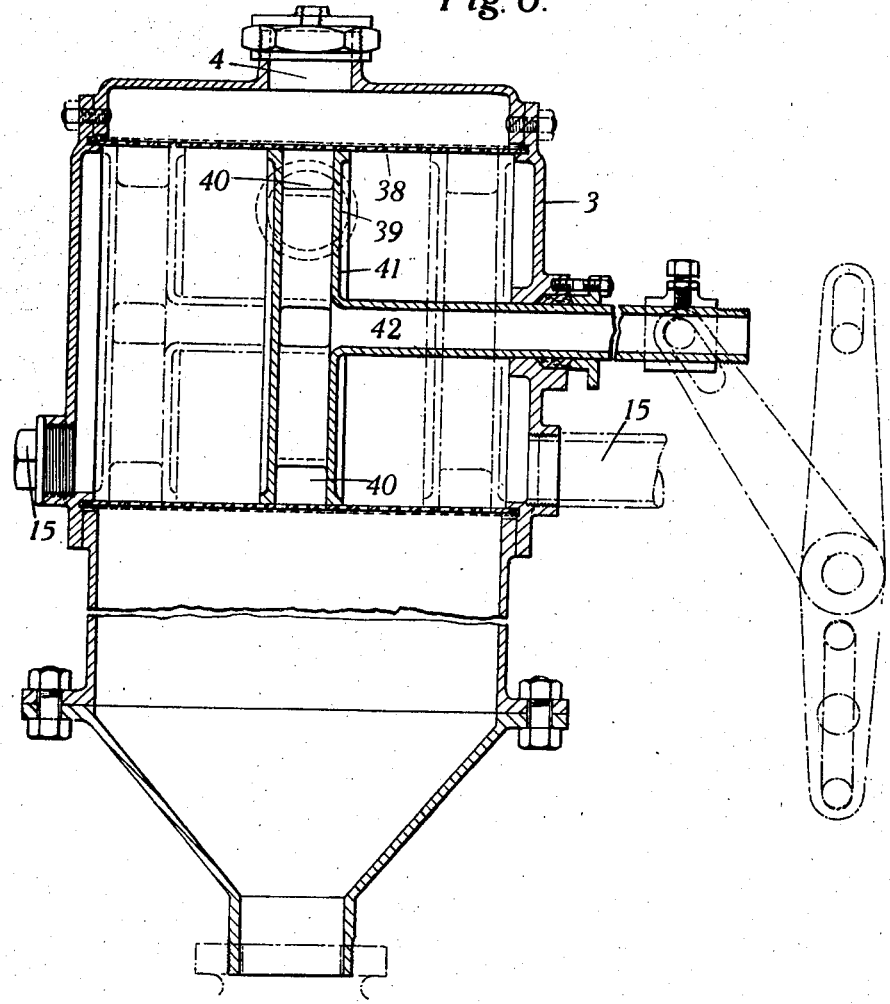
Fig. 6 is a side sectional elevation and Fig. 7 an end sectional elevation of a third form comprising a drum type filter and a reciprocating cleansing head.

Neither is it necessary for the purposes of the present invention that the pressure compartment should rotate. Sliding or oscillating devices are equally applicable as for example is shown in Figs. 6 and 7. According to this form of the invention, a filter drum 38 is employed containing a reciprocating piston 39 provided with a peripheral groove 40 communicating through hollow spokes 41 or the equivalent with a central hollow shaft 42 which is arranged to be reciprocated to move the piston head to and fro along the drum. Bye-passed filtrate or other pressure fluid is forced along the hollow shaft and into the peripheral groove, so that as the piston reciprocates the pressure material is forced through filtering media around the drum into the crude material receiver in which the drum is mounted. The spoked construction of the piston head enables the filtrate to pass freely through such head so that the piston has no plunger action, but in reciprocating slowly in the cylindrical drum, the piston merely serves the purpose of conveying the pressure fluid progressively through the filtering medium.

The receiver and filter drum may be similar in construction to those described in the first constructional form above referred to, the crude material entering at or near the top of the receiver and the filtrate being taken off from within the drum in which the piston reciprocates. The receiver is of sufficient depth to provide space for the material to collect in the lower part of the receiver clear of the filtering media.

According to another variant form a hollow Archimedean screw is employed, the pressure material being conducted to a continuous opening or a series of openings in the outer portion of the screw as such portion works over the inner surface of the drum.

Any suitable means may be employed for drawing off the filtrate or for feeding the pressure fluid to the cleaning zone. For example, a device working on the injector principle may be used in place of a pump.

In some cases two or more filters having filtering media of different mesh could be arranged in series, the material undergoing graded filtering by first being treated by the coarser mesh media and then by the finer mesh media.

Instead of constructing the vacuum chamber, the cleansing head and the means for moving the latter as a unit with the crude material receiver, the said parts and the filtering media carried thereby could be partially submerged into a holder for the crude material, the cleansing or pressure head being driven for example by means of a flexible shaft, and flexible pipes being provided for taking off the filtrate discharge and for leading the cleansing medium to the cleansing or pressure head. In certain cases the pump itself could be submerged, e. g., in the filtrate chamber. In all cases however the filtering medium must protect all moving parts liable to be injured by the access of dross.

Instead of dismantling the device for general cleaning purposes, the outlet valve may be closed and volatile oil or other suitable cleaning medium caused to circuate through the apparatus.

Filtering apparatus according to this invention may be used, as has been previously stated, for a great number of purposes; for example, it could be used in conjunction with the lubricating system of internal combustion or other engines, e. g., as part of the lubricating circuit, either on vehicles, ships or elsewhere. It can also be employed in various industries where filtering is necessary, such as in the filtration of beer, and as hereinabove described, paints, varnishes and like viscous materials, or in the filtration of aqueous materials containing solid matter.

Filtration carried out according to my invention presents the following advantages:

The process of filtration proceeds continuously and is not interrupted by the cleansing operation. The cleansing head operating on the clean side of the filtering medium and in close proximity thereto can exert the maximum effect without exposing such filtering medium to the injury which might result if the cleansing head pressed close against it, and further such cleansing head acts uniformly on each part of the filtering medium in turn so that filtration can proceed perfectly evenly. All moving parts to which injury might be caused by the access of dross are protected therefrom by the filtering medium, and since the cleansing is effected by a portion of the filtrate being lead under pressure to the cleansing head no foreign matter is introduced into the liquid being filtered and the dross blown back by the cleansing head separates out from the liquid under the influence of gravity, which avoids the loss of valuable liquid which is involved when such dross is piped away.

We have also found that by projecting the cleansing medium into the main body of the raw material turbulence is produced which apparently assist the regular process of the filtration.

In each of the forms illustrated the cleansing head moves over the clean side of the filtering surface so that the dross is not rubbed against the surface of the filtering medium, since rubbing leads to the breakage of the filtering medium, and we would have it understood that this specification and the claims thereof do not include processes or apparatus in which cleansing heads or scrapers are applied to the filtering medium on the side on which the dross collects.

It will be observed that in all the forms of construction herein described and claimed, the cleansing means, viz., the cleansing head or heads, the conduit or conduits which convey the filtrate under pressure thereto and the means for rotating the head are confined to the filtrate side of the filtering medium. Such means have no part in the crude material and have no connection even by a running joint therewith. Where a running joint is provided extending from one side of the filtering medium to the other, such as where the cleansing means comprise a cleansing head on one side and another on the other, the complete isolation of the filtrate from the crude material, except by way of the filtering medium, cannot be obtained since a passage is quickly formed, owing to the wear of the joint, through which crude material can pass and mix with the filtrate. By the method according to the present invention the filtrate is completely isolated from the crude material, except by way of the filtering medium, since there are no joints to which the crude material can obtain access.

What I claim is:

1. A method of filtering solid bodies out of liquids to obtain a pure filtrate which consists in passing the liquid to be filtered through a stationary filtering medium, isolating the filtrated liquid completely from the crude material except by way of the filtering medium, returning a confined body of the filtrate toward the filtering medium under a pressure greater than that of the crude material and passing said confined body of filtrate under pressure through a portion of the filtering medium in a direction reverse to the main flow therethrough to dislodge the dross adhering to the crude material side thereof and to discharge same together with the returning filtrate into the crude material whilst continuously carrying on filtration, moving said confined body of filtrate under pressure progressively over the filtrate side of the filtering medium and maintaining its volume uniform so that the crude material side of the filtering medium is uniformly cleansed, said returning filtrate carrying the dross therewith freely mixing with the crude material whereupon such dross or the major portion thereof separates itself from the crude material under the influence of gravity.

2. A method of filtering solid bodies out of liquids to obtain a pure filtrate which consists in passing the liquid to be filtered through a stationary filtering medium under the influence of a vacuum, isolating the crude material completely from the filtrated liquid except by way of the filtering medium, returning a confined body of the filtrate toward the filtering medium under a pressure greater than that of the crude material and passing said confined body of filtrate under pressure through a portion of the filtering medium in a direction reverse to the main flow therethrough to dislodge the dross adhering to the crude material side thereof and to inject same together with the returning filtrate into the crude material whilst continuously carrying on filtration, continuously moving said confined body of filtrate under pressure progressively over the filtrate side of the filtering medium and maintaining its volume constant so that the crude material side of the filtering medium is uniformly cleansed, said returning filtrate carrying the dross therewith freely mixing with the crude material whereupon such dross or the major portion thereof separates itself from the crude material under the influence of gravity.

3. Apparatus for filtering solid bodies out of liquids to obtain a pure filtrate, comprising a receptacle, an inlet thereto for the crude material to be filtered and an outlet therefrom for the dross, a filtrate chamber within said receptacle, filtering means within said receptacle completely separating the filtrate chamber from said inlet, said filtering means being fixed in relation to said filtrate chamber, means for passing the liquid to be filtered through said filtering means into said filtrate chamber, cleansing means for said filtering means consisting of at least one movable cleansing head arranged in said filtrate chamber with its opening in close proximity to said filtering means so as to form therewith a cleansing chamber which is substantially closed from the filtrate chamber and confined wholly to the filtrate side of said filtering means so that such cleansing means have no part in the crude material receptacle and no communication even by a running joint therewith except through said filtering means; said cleansing means also including a conduit for conveying filtrate under pressure to said head; means for moving said head in said filtrate chamber over the filtrate side of said filtering means; and means for forcing a portion of the filtrated liquid under pressure through said conduit to said cleansing head and thence through a portion of the filtering means to dislodge dross adhering to the receptacle side of the filtering means and to discharge same together with the dross carrying filtrate into said receptacle whereupon the dross forced off of the filtering means separates by gravity from the liquid being filtered and accumulates in the receptacle away from the filtering means.

4. Apparatus for filtering solid bodies out of liquids to obtain a pure filtrate, comprising a receptacle, an inlet thereto for the crude material to be filtered and an outlet therefrom for the dross, filtering means fixed in said receptacle dividing the same into a receiving chamber and an upper filtrate chamber; a pump for creating a partial vacuum in said filtrate chamber to draw the liquid from the receiving chamber through the filtering means; cleansing means in said receptacle and confined to the filtrate side of said filtering means so that such cleansing means have no part in the crude material receptacle and no communication even by a running joint therewith except through said filtering means, said cleansing means consisting of at least one movable cleansing head positioned in close proximity to the said filtering means so as to form therewith a cleansing chamber which is substantially closed from the filtrate chamber, of at least one conduit for conveying filtrate under pressure to said head and of means for moving said head in said filtrate chamber over the filtrate side of said filtering means; and liquid connections between said pump and cleansing head for forcing part of the filtrate drawn through the filtering means under pressure through said conduit to said cleansing head, a funnel-like sump underlying said filtering means and located in the lower part of said receiving chamber for receiving the dross forced off the filtering means as it separates by gravity from the liquid to be filtered.

5. Apparatus for filtering solid bodies out of liquids to obtain a pure filtrate, comprising a receptacle, an inlet thereto for the crude material to be filtered and an outlet therefrom for the dross, a stationary filtering drum mounted in the upper part of said receptacle forming a filtrate chamber, a rotatable hollow sector arranged in said chamber in close proximity to the filtrate side of said filtering drum so as to form therewith a cleansing chamber which is substantially closed from the filtrate chamber, means for rotating said sector in said filtrate chamber over the filtrate side of said filtering means, said sector and said means for rotating it being confined wholly to the filtrate side of said filtering means so that such cleansing means have no part in the crude material receptacle and no communication even by a running joint therewith except through said filtering means, and means for forcing filtrate under pressure to said cleansing sector and thence through said filtering means in a direction reverse to the main flow through said filtering means for dislodging the dross adhering to the receptacle side of said filtering means and to discharge same together with the returning filtrate into said receptacle wherein it separates by gravity and accumulates in the lower portion of the receptacle away from the filtering medium.

WILLIAM JAMES FORREST.